United States Patent [19]
Cannon

[11] 3,944,298
[45] Mar. 16, 1976

[54] TRUCK BOLSTER CENTER BOWL WEAR PLATE

[75] Inventor: John G. Cannon, Penn Hills, Pa.

[73] Assignee: Westinghouse Air Brake Company, Wilmerding, Pa.

[22] Filed: Feb. 24, 1975

[21] Appl. No.: 552,558

[52] U.S. Cl............................. 308/137; 105/199 C
[51] Int. Cl.²F16C 17/00; F16C 19/00; F16C 21/00; B61F 3/00
[58] Field of Search.......... 308/137, 138; 105/199 C

[56] References Cited
UNITED STATES PATENTS

| | | | |
|---|---|---|---|
| 1,912,563 | 6/1933 | Allison | 308/137 |
| 3,346,302 | 10/1967 | Robinson et al. | 308/137 |
| 3,466,102 | 9/1969 | Goodwyn | 308/137 |
| 3,667,820 | 6/1972 | Sherrick | 308/137 |
| 3,832,954 | 9/1974 | Amwake | 105/199 C |

*Primary Examiner*—Lloyd L. King
*Attorney, Agent, or Firm*—W. F. Poore; R. W. McIntire, Jr.

[57] ABSTRACT

This invention relates to a replaceable plastic wear member which is disposed within the center bowl of a railway vehicle truck bolster and interposed between the bottom of the center bowl and a vehicle body bolster center plate that extends from the bottom of the body into the center bowl in abutting relation with the upper side of the wear member, the purpose of which member is to prevent wear of the bottom of the center bowl by the relative movement between the car body and the truck bolster.

4 Claims, 1 Drawing Figure

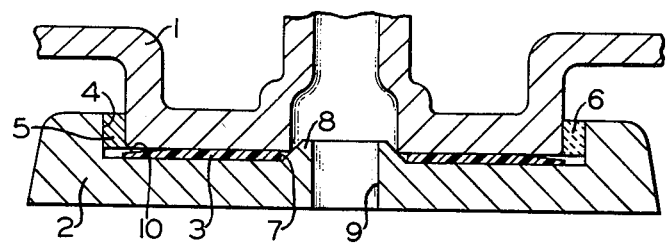

TRUCK BOLSTER CENTER BOWL WEAR PLATE

BACKGROUND OF THE INVENTION

In order to prevent wear of both the bottom and also the annular side walls of the center bowl of truck bolsters it has heretofore been the practice to place in the center bowl both a flat annular metallic disc-like wear member that is interposed between the bottom of the center bowl and the lower end of the vehicle body bolster center plate and a metallic wear ring that is interposed between the annular vertical inside wall surface of the center bowl and the vertical peripheral surface of the vehicle body bolster cetner plate and welded to this wall surface of the center bowl.

In actual practice it has been found that the rate of wear of the flat disc-like member exceeds that of the wear ring. However, replacement of the worn flat disc-like member has heretofore required the removal, thereafter the replacement and then the subsequent rewelding of the wear ring. This procedure is both time consuming and expensive.

Moreover, it has heretofore been the practice to place a disc of solidified lubricant between the upper side of the above-mentioned flat annular metallic disc-like wear member and the lower end of the vehicle body bolster. The relative movement that occurs between the car body and the truck bolster causes wear of this disc of solidified lubricant so that it has to be periodically replaced. Such replacement requires raising the car body vertically relative to the truck bolster. It is apparent that this also is both time consuming and expensive.

Finally, the continuous relative movement or rocking between the car body and the truck while a vehicle is traveling along a railway track results in the outer portion of the bottom of the vehicle body bolster constantly hammering or pounding against the outer peripheral portion of the flat annular metallic wear member. This constant hammering or pounding successively transmits high compressive forces to the outer peripheral portion of the metallic wear member which portion is deformed, gouged, or even shattered thereby, thus often necessitating replacement of this wear member after a short service life.

Accordingly, it is the general object of this invention to provide an inexpensive flat, annular, plastic wear member for interposition between the bottom of a truck bolster center bowl and the bottom of a vehicle body bolster center plate.

It is another object of the present invention to provide a flat, annular, plastic wear member having on its upper side an annular bevel extending inward a chosen distance from the outer periphery thereof, the purpose of this beveled portion being to eliminate the constant hammering of the vehicle body bolster against the outer portion of the wear member and thereby preventing damage thereto.

It is a third object of this invention to provide for disposition in a truck bolster center bowl of a flat, annular wear member constructed of a material having such characteristics as not to require the use of a disc of solidified lubricant between the upper side of the wear member and the lower end of the vehicle body bolster in order to prevent the bottom of the vehicle body bolster from digging into, gouging or otherwise marring and damaging this upper side of the wear member.

It is a final object of the present invention to provide for disposition in a truck bolster center bowl of a flat, annular wear member having such diameter and thickness and being constructed of a material possessing sufficient flexibility as to enable removal from the center bowl by the insertion of the end of a hook-like tool between the wear member and the bottom of the center bowl adjacent the periphery of a central bore in the wear member and thereafter, by means of the application of an upward thrust to the upper end of this tool, pulling the wear member through the truck bolster center plate vertical ring wear liner while this liner remains welded to the wall of the truck bolster center bowl.

SUMMARY OF THE INVENTION

According to the present invention, a substantially flat, annular, plastic wear element for interposition between the bottom of the center bowl of a truck bolster and the bottom of a vehicle body center plate extending into the center bowl is provided on the side thereof adjacent the vehicle body bolster with an annular bevel extending inward a chosen distance from the outer periphery thereof and is of such diameter, thickness and flexibility as to enable the insertion and withdrawal of this wear element via the truck bolster center plate vertical ring wear liner which is welded to the wall surface of the truck bolster center bowl without removal of this ring wear liner from the center bowl.

In the accompanying drawing:

The single FIGURE is an elevational view, in cross section, showing a wear element embodying the invention interposed between a body bolster center plate and the bottom of the center bowl of a vehicle truck bolster.

Referring to the drawing, a body bolster 1 of a railway vehicle body is supported on a vehicle truck bolster 2 by means of a substantially flat, annular replaceable plastic truck bolster center plate horizontal wear liner or member 3 that is disposed in a bottomed bore 4 which constitutes the center bowl of the truck bolster 2.

The replaceable center plate wear member 3 may be formed, as by cutting, from a flat sheet of low friction, semi-flexible, high-load-carrying ability plastic material such as, for example, the molecularly oriented polyolefin material sold by the Dixon Corporation, Metacom Avenue, Bristol, Rhode Island, under the name of Pennlon. The outside diameter of the center plate wear member 3 is selected to be the same as the inside diameter of a metallic truck bolster center plate vertical split ring wear liner or member 5. This member 5 is disposed in the bottomed bore 4 so that the upper end thereof is flush with the upper end of this bottomed bore and welded to the wall surface of this bottomed bore 4 as indicated by the reference numeral 6.

Subsequent to cutting the center plate wear member 3 from the flat sheet of plastic material, a central bore 7 is provided therein as by, for example, a drilling operation. The diameter of this central bore 7 is so selected as to enable the wear member 3, when placed in the bottomed bore 4, to be disposed in surrounding relation to a central king pin boss 8 that is formed integral with the truck bolster 2 and provided with a bore 9 for receiving therein a king pin (not shown).

It is well known that, when a railway vehicle is traveling at a high speed, rocking of the vehicle body relative to the vehicle truck, and therefore relative to the truck bolster, occurs.

Accordingly, the center plate wear member 3 is further provided, as by a machining operation, with an annular bevel 10 that extends inward a chosen distance, as for example, 1½ inches from the outer periphery of the wear member 3.

The provision of the bevel 10 enables limited rocking and sidewise shifting of the car body bolster 1 relative to the truck bolster 2, especially if the weld 6 should fail and the vertical split ring wear member 5 work upward and out of the bottomed bore 6, as often occurs as the result of vibration, without the car body bolster 1 crushing or otherwise damaging the annular outer edge or periphery of the plastic center plate wear member 3.

Since the center plate wear member 3 is formed from a plastic material such as the aforementioned molecularly oriented polyolefin material sold under the name of Pennlon, the above-mentioned sidewise shifting of the car body bolster 1 relative to this wear member 3, subsequent to the loss of the split-ring wear member 5, is less likely to dig in, gouge, or otherwise mar and damage the flat upper surface of this wear member 3 than would be the case if this wear member 3 were formed from a sheet of manganese or carbon steel, as heretofore has been common practice in order to comply with the specifications of the Association of American Railroads for truck bolster center plate horizontal wear liners or members.

Therefore, when the center plate wear member 3 is constructed of a plastic material, such as, for example, the aforementioned molecularly oriented polyolefin material sold under the name of Pennlon, the use of a solidified lubricant disc disposed between the center plate wear member 3 and the body bolster 1 is not necessary. Accordingly, this elimination of the necessity to use a solidified lubricant disc reduces the cost of maintenance of a railway vehicle provided with center plate wear members constructed of a suitable plastic material.

Having now described the invention, what I claim as new and desire to secure by Letters Patent, is:

1. In a vehicle, the combination comprising:
   a. a truck bolster having therein a center bowl provided with an annular wall and a flat bottom from the center of which extends a boss,
   b. a center plate vertical ring wear liner so disposed in said center bowl and fixedly secured to the annular wall thereof that the outer end of said center bowl and one end of said ring wear member lie in a common plane,
   c. a vehicle body having a bolster of such a diameter as to extend through said ring wear member for disposition in said center bowl, and wherein the improvement comprises:
   d. an annular wear member formed of a low friction, semi-flexible, high-load-carrying ability, plastic material, and having an outside diameter the same as the inside diameter of said ring wear liner to enable the insertion thereof through said ring wear liner into surrounding relation with said boss of said center bowl for interposition between said flat bottom of said center bowl and said body bolster to support thereon said body bolster.

2. In a vehicle, the combination comprising:
   a. a truck bolster having therein a center bowl provided with an annular wall and a flat bottom from the center of which extends a boss,
   b. a vehicle body having a bolster for disposition in said center bowl, and, wherein the improvement comprises:
   c. an annular wear member formed of a low friction, semi-flexible, high-load-carrying ability, plastic material and being provided with an annular bevel extending inward a chosen distance from the outer periphery of said wear member, said wear member being disposed in said center bowl in surrounding relation to said boss and interposed between said body bolster and said truck bolster for supporting thereon said body bolster.

3. In a vehicle, the combination recited in claim 1, further characterized in that said annular wear member is provided with an annular bevel extending inward a chosen distance from the outer periphery thereof to enable limited rocking movement of said vehicle body bolster relative to said truck bolster without said vehicle body bolster inflicting damage to the periphery of said annular wear member.

4. In a vehicle, the combination recited in claim 1, further characterized in that said annular wear member is formed from a molecularly oriented polyolefin material.

* * * * *